United States Patent [19]

Sellers

[11] 3,828,869
[45] Aug. 13, 1974

[54] WEIGHT CONTROL SYSTEM

[75] Inventor: Kenneth W. Sellers, Dallas, Tex.

[73] Assignee: Frito-Lay Inc., Dallas, Tex.

[22] Filed: Aug. 30, 1972

[21] Appl. No.: 284,708

[52] U.S. Cl............... 177/50, 177/1, 177/60, 177/116, 235/151.33
[51] Int. Cl............................................. G01g 19/52
[58] Field of Search............ 177/1, 6.75, 15, 25, 26, 177/50, 60, 63, 64, 80, 81, 116–123, 45, 164, 210, DIG. 1, DIG. 3, DIG. 11; 235/157.1, 158.53

[56] References Cited
UNITED STATES PATENTS

| | | | |
|---|---|---|---|
| 2,809,009 | 10/1957 | Total.................................. | 177/121 |
| 2,933,281 | 4/1960 | Hyde et al. ......................... | 177/121 |
| 3,155,277 | 11/1964 | Fath et al............................ | 177/16 |
| 3,263,760 | 8/1966 | Waller ................................ | 177/116 |
| 3,445,638 | 5/1969 | Montgomerie...................... | 235/92 |
| 3,474,874 | 10/1969 | Pettis, Jr............................. | 177/45 |
| 3,477,529 | 11/1969 | Burn et al........................... | 177/50 |
| 3,498,395 | 3/1970 | Henry.................................. | 177/1 |
| 3,659,665 | 5/1972 | Godwin et al. .................... | 177/1 |
| 3,724,569 | 4/1973 | Blodgett.............................. | 177/1 |

*Primary Examiner*—Richard B. Wilkinson
*Assistant Examiner*—Vit W. Miska
*Attorney, Agent, or Firm*—Pennie & Edmonds

[57] ABSTRACT

A weight control system is disclosed for accurately dispensing a preselected quantity of material. The system include a circuit for generating an optimum weight profile curve which represents the desired quantity of material in terms of net weight to be dispensed with respect to time. The curve is an exponentially increasing function of time having a rate of increase that progressively decreases so that the curve approaches an asymptotic level which represents the total net weight of the material to be dispensed. The curve is segmented into small time intervals, and at each interval the weight of the material dispensed is compared with the optimum weight defined by the curve. Depending on whether the accumulated weight of the material dispensed at each time interval is greater or less than the optimum weight, a circuit is enabled for conducting current to one or more material feeders which in turn dispense the material into a charge hopper.

A circuit is provided which detects a change in the tare weight of a scale due to the accumulation of foreign materials on the scale. The circuit automatically compensates for these accumulations which would otherwise cause an undesirable variance in the weight of the charge of material.

8 Claims, 9 Drawing Figures

3,828,869

$$WT = \left[1 - e^{\frac{-t}{rc}}\right]$$

WEIGHT CONTROL SYSTEM

BACKGROUND OF THE INVENTION

This invention relates to a weight control system for accurately dispensing a preselected quantity of material into a container.

In high speed packaging operations where a material is batched into individual batches or charges which are then placed in a package on a net weight basis, certain difficult and long standing problems have been encountered. One of these problems is controlling or minimizing package weight variance; i.e., the excursion of net package weight from a desired, predetermined net package weight. A primary reason for variances in net package weight is the inability of present package filling systems to feed material into a charge container at a constant rate. Considerable attention has been given by the industry to solving this problem but attempted solutions have not been as successful as desired.

One of the best known methods of dispensing material to form a charge which is then packaged is commonly termed the "bulk-dribble" technique. By this technique material is initially dispensed at a relatively high feed rate to form a charge until the weight of the charge reaches a preselected high percentage, e.g. 90 percent, of its ultimate net weight. This phase of the dispensing operation is called the bulk feed interval. Once the weight of the charge reaches the preselected percentage of its utlimate weight, the material is dispensed at a lower rate of feed. This phase is designated the dribble feed interval and is completed when the weight of the charge reaches the predetermined net weight. By using the "bulk-dribble" technique, the quantity of material in transit between the dispenser and the charge weighing scales is substantially reduced during the dribble feed interval. The quantity of material in transit is subject to random fluctuations which are not readily controllable by the dispensing mechanism. This is particularly so when the material consists of particles of non-uniform size and weight, such as potato chips and other such food items. If the quantity of material passing from the dispenser to the charge weighing scales at any given time is relatively small, the relative weight of the random fluctuations of material is reduced thereby reducing the variance in package weight. Accordingly, the "bulk-dribble" technique has been effective to reduce variances in net package weight.

The "bulk-dribble" technique, however, is subject to a number of drawbacks which tend to complicate assembly line package filling processes and which require a skilled operator to be on hand to control the package filling mechanism. These drawbacks occur for a number of reasons including the fact that the feeder pans of the dispenser become dirty from the minute accumulation of material which sticks to the pans' surface thereby slowing the material flow from the pans into the charge. This in turn slows the feed rate which fact perturbs the rate at which packages are filled in the assembly line filling process.

A further problem is that the scales for weighing the charge typically needs adjusting from time to time due to the accumulation of small quantities of material on the surface thereof. If the adjustment is not made, variance from desired package weight will result. In the past, a skilled operator was required to make the necessary adjustments in the scales and in the dispenser feed rate. Since the decision as to whether the variances are caused by accumulation on the scales or an improper feed rate is left to an operator, the error in the quantity of the material dispensed was often greater than need be.

It, therefore, is an object of this invention to provide a system for accurately dispensing a predetermined quantity of material that does not rely on operator skill to adjust for either scale accumulations or improper feed rate.

SHORT STATEMENT OF THE INVENTION

Accordingly, this invention relates to a package weight control system including a means for generating a package weight profile curve wherein the curve represents the optimum weight of a charge of material to be packaged with respect to time. At discrete time intervals, a comparator compares a signal proportional to the weight of the charge of material with the optimum weight profile curve. When the weight of the charge is less than the optimum weight desired, a feeder system is energized to dispense more material into the charge. A periodic measurement is made of the tare weight of the scales, and a compensating signal is derived which is equivalent to the biasing effect of the accumulation on the scales. The compensating signal is subtracted from the output signal of the scales thereby substantially canceling out the effect of scale accumulations.

BRIEF DESCRIPTION OF THE DRAWINGS

Other objects, features and advantages of this invention will become more fully apparent from the following detailed description, appended claims and accompanying drawings in which:

DETAILED DESCRIPTION OF THE PREFERRED EMBODIMENT

Figure 1:
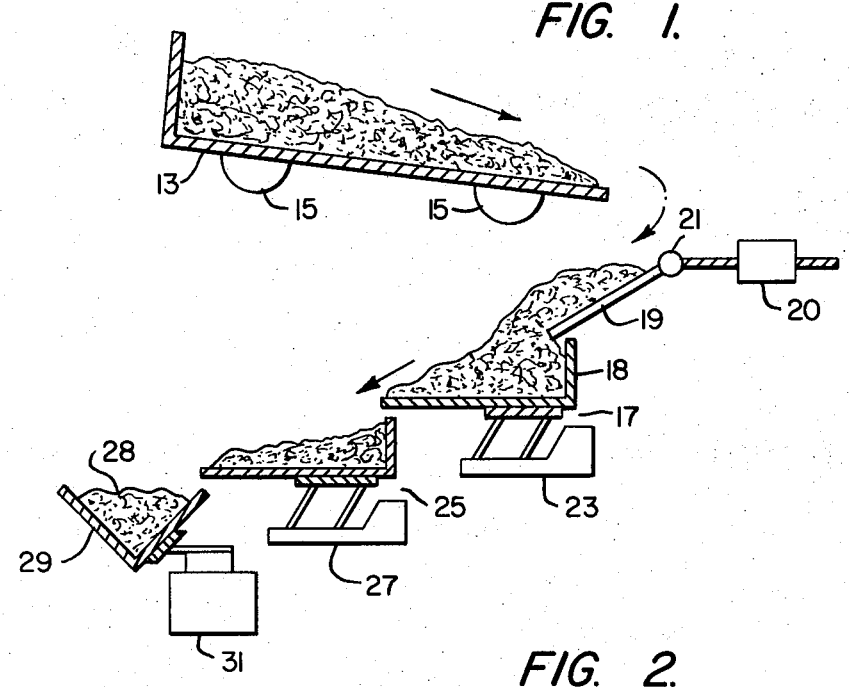
FIG. 1 is a simplified illustration of a conventional material dispensing system.

Refer now to FIG. 1 which is a simplified illustration of the material dispensing apparatus of the package weight control system of this invention. The material 11 to be packaged is initially placed in a relatively large primary hopper 13. At least one primary feeder 15, attached to the hopper 13, vibrates when energized to cause the hopper to dispense material onto a flow control spade 19 and into the hopper 18 of a rear vibratory feeder 17.

The flow control spade 19 is rotatable about a pivot point 21 with one end of the spade having a counterweight 20 thereon so that when the weight of the material resting on the other end of the spade drops below the level required to balance the spade, the spade pivots in a clockwise direction thereby actuating a switch (not shown) which couples excitation current to the primary feeders 15. Energization of feeders 15 results in additional material being dispensed onto spade 19 and into the hopper of rear feeder 17.

As will be explained more fully hereinafter, the hopper 18 of feeder 17 is vibrated by a vibrator mechanism 23 at controlled time intervals to dispense material from hopper 18 into a front vibratory feeder 25. Front feeder 25 is vibrated at the same controlled time intervals as rear feeder 17 by a vibrator mechanism 27 to dispense material therefrom into a hopper or charge container 29. The amplitude of vibration of rear feeder 17 is preferably adjusted to be less than the amplitude of vibration of the front feeder 25 so as to smooth out the flow of material into the hopper 29. When the weight of the charge 28 in hopper 29 reaches a predetermined desired level as determined by a scale 31, the charge is poured into a package for eventual distribution.

Figure 2:
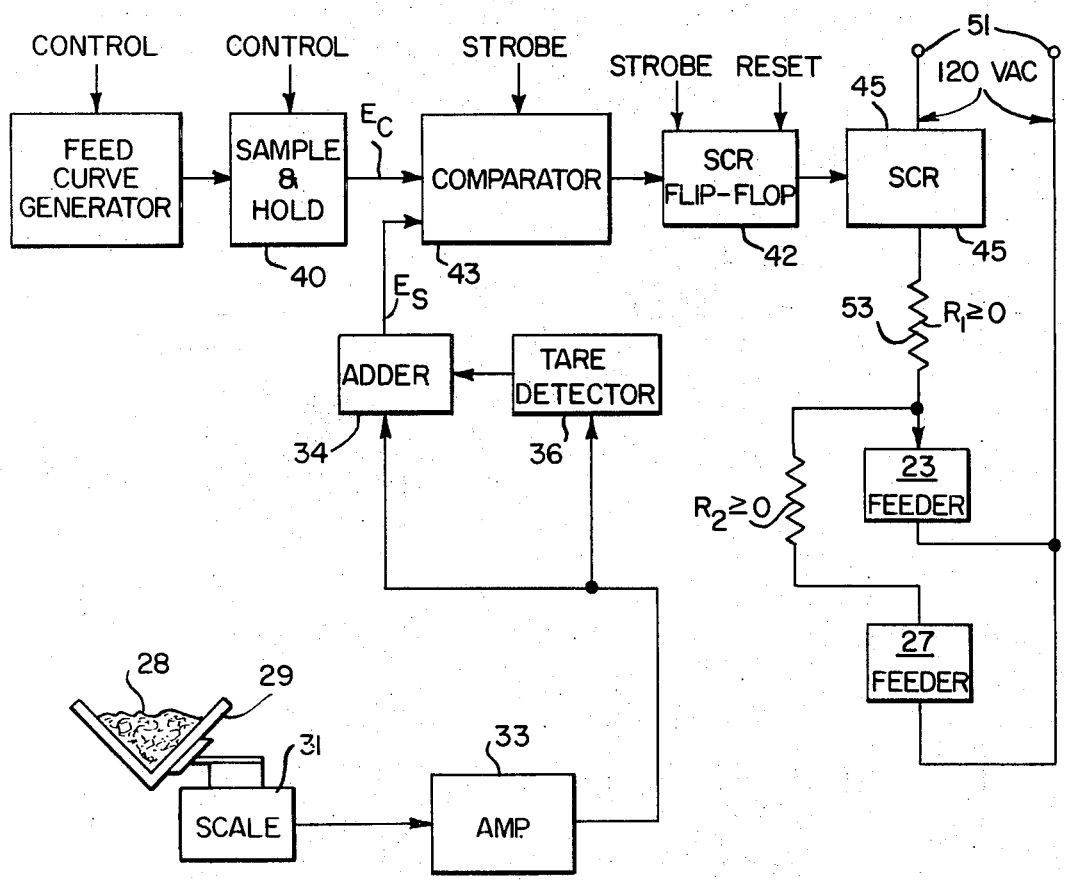
FIG. 2 is a block diagram of the control system for dispensing material into a package.
Figure 8:
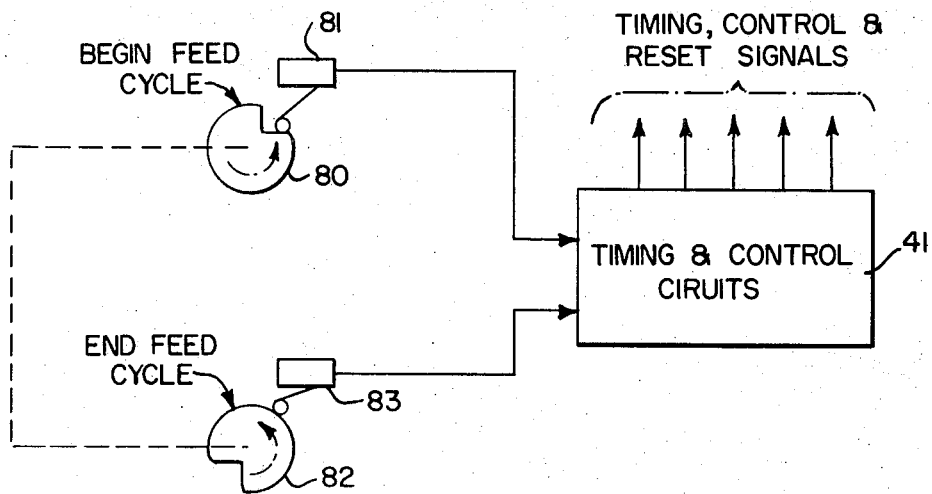
FIG. 8 is a simplified block diagram of the timing circuit of this invention.

Refer now to FIG. 2 which is a schematic block diagram of the control system for energizing the vibrators 23 and 27 at selected time intervals. The block diagram shows various strobe, control and reset signals being injected into the various functional blocks. It is understood that such strobe, control and reset signals are commonly used in electronic circuitry and can be appropriately provided by various techniques well-known in the art. The strobe, control and reset signals must, of course, be in time coordination with the mechanical operation of the system of this invention. FIG. 8 shows how such time coordination is accomplished. Cam 80 operates switch 81 which in turn signals the timing and control circuits 41 that a feed cycle has begun. Similarly cam 82 and switch 83 signals that the feed cycle has ended.

The material in the hopper 29 is continuously weighed by the scales 31. A transducer which generates an electrical signal proportional to linear displacement is attached to the scales so that a voltage proportional to the weight of the material in the hopper 29 is continuously generated. The transducer output is connected to the input of an amplifier 33. The output of the amplifier is connected to one input of an adder 34. The output of amplifier 33 is also connected to the input of a tare detector 36 which will be more fully described hereinbelow. The output of the tare detector 36 is connected to the second input terminal of the adder 34. The adder algebraically sums the scale signal at the output of amplifier 33 and the tare signal which is a negative value to produce a signal proportional to the weight of the charge 28 exclusive of the accumulations of foreign materials on the scale at the beginning of the feeding cycle.

The tare detector is a circuit which periodically measures the value of the accumulations on the scale. This is normally accomplished by periodically after a predetermined plurality of charges have been dispensed omitting the feed to the scale for one cycle. During this cycle, the value of the scale signal with an empty hopper 29 is digitalized and stored in tare detector 36. During this cycle the system is in the tare-detect mode. The tare-detect mode automatically occurs as the first or initial machine cycle at system start-up and can be instituted at any time during system operation at the command of an operator.

In subsequent normal feed cycles, the output of the tare detector is subtracted from the value of the scale signal by the adder circuit. Thus, the adder output represents the net value of scale hopper contents 28 exclusive of the accumulation on the scale at the last tare-detect measurement. The output of the adder which is coupled to one input of comparator circuit 43 has the same zero reference as the optimum weight profile curve which represents the desired weight of the material in the hopper 29 with respect to time.

Figure 3:
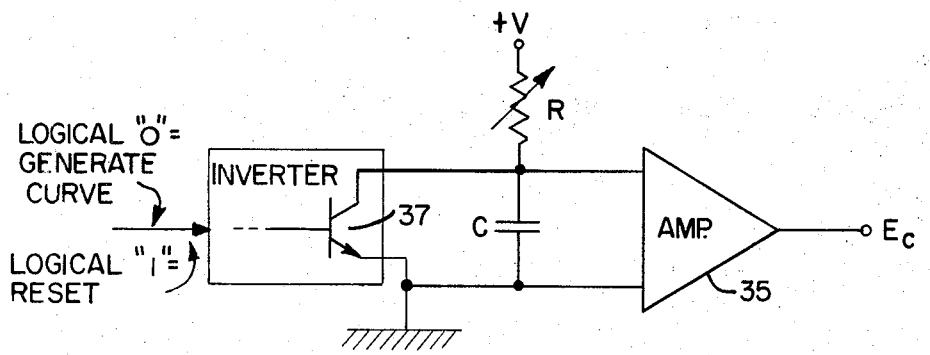
FIG. 3 is a simplified schematic drawing of a circuit for generating an optimum weight profile curve.

Refer now briefly to FIG. 3 for a discussion of the profile curve generator. The generator includes an RC circuit having a variable resistor R and a fixed capacitor C connected in series across a source of DC voltage V. The collector-emitter terminals of a transistor 37 are included in a standard open collector digital inverter. An amplifier 35 is also connected across the capacitor C with the output thereof being connected to a sample and hold circuit 40. The output of the sample and hold circuit is connected to the other input of comparator 43. The sample and hold circuit is gated by a strobe signal derived from appropriate timing circuits 41. The strobe pulse is generated once during each of a predetermined plurality of time intervals so that the sample and hold circuit 40 stores the value of the amplified voltage across the capacitor C for the duration of the time interval.

The output of the comparator is connected to an SCR flip-flop 42. The output of the SCR flip-flop is connected to a zero voltage crossing silicon controlled rectifier circuit 45. When the SCR flip-flop 42 is strobed, it turns "on" i.e., its Q output will become a logical "1," thus enabling the SCR circuit 45 to conduct current from terminal 51 to the feeders 23 and 27. The "off" state of the SCR flip-flop 42 and consequently the SCR circuit 45 is always assured by a "Reset" pulse which always occurs at an appropriate time during each time increment. The SCR circuit controls the conduction of current from a 120 volt, 60 Hz supply to vibratory feeders 23 and 27 via resistors $R_1$ and $R_2$. The resistors $R_1$ and $R_2$ limit the amplitude of current coupled to the feeders 23 and 27 and hence limit the amplitude of the vibrational movement generated by the feeders. The values of the resistors can be varied according to need and can even be omitted if desired.

Figure 4:
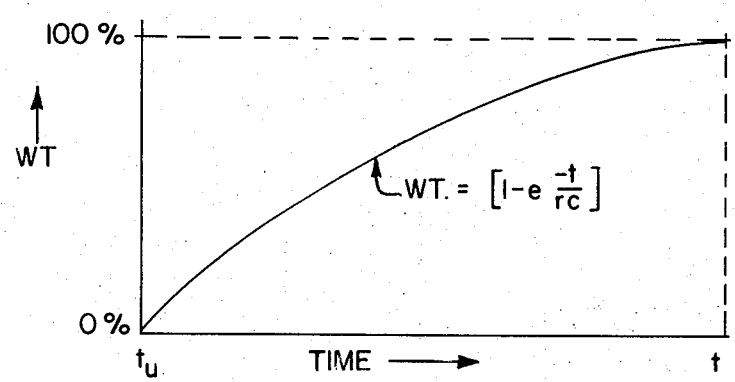
FIG. 4 is a graphical display of the optimum weight profile curve.
Figure 5:
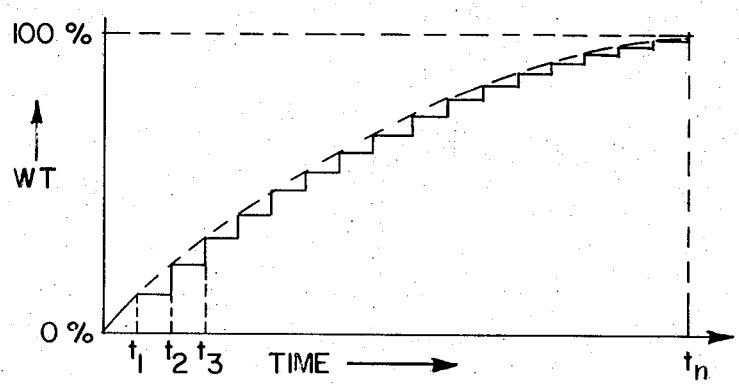
FIG. 5 is a graphical display of the input signal to the comparator of this invention.

In operation, a logical "1" i.e., a positive signal, generated by the timing circuits 41 is coupled to the open collector digital inverter thereby turning on transistor 37. The capacitor C is thereby discharged or reset so that a cycle can be initiated. With the capacitor C discharged, a new cycle is started by coupling a logical "0" to the open collector digital inverter to thereby turn off transistor 37. With transistor 37 turned off, a charging interval is initiated during which the voltage across the capacitor increases exponentially according to the following expression:

$$E_c = V(1 - e^{-(t/RC)})$$

where $E_c$ is the voltage across the capacitor, and $V$ is the DC voltage of the power supply. A graphical display of the voltage $E_c$ is shown in FIG. 4. It can be seen from an inspection of both the equation and FIG. 4, that the rate of increase of the curve is dependent on the values of resistor R and capacitor C and that the curve approaches an asymptotic level which represents the ultimate net weight of the charge in hopper 29. The rate of increase in the voltage $E_c$ decreases as the curve approaches its asymptote and accordingly, if the accumulated weight of the charge in hopper 29 follows the illustrated curve, the rate of increase in charge weight will gradually decrease as the charge approaches the predetermined net weight limit. The voltage $E_c$ is amplified and coupled to the sample and hold circuit 40. Refer now to FIG. 5 which shows the output of the sample and hold circuit with respect to time. At time $t_1$ the circuit is strobed by a pulse from timing circuits 41 which causes the circuit to store the value at the output of amplifier 35. This stored value is held in the sample and hold circuit until time $t_2$. When the sample and hold circuit is again sampled at time $t_2$, a new value of voltage at the output of amplifier 35 is again stored. This continues until the time $t_n$ when the charge in the hopper 29 reaches its final value and further feeding ceases. The time increments between each strobe pulse can be varied according to the type of feeder equipment utilized but in the preferred embodiment is 16.67 milliseconds which is the period of one cycle of the voltage which drives the vibrators 23 and 27.

The output of the sample and hold circuit 40 is coupled to one input of the comparator 43. At the same time the weight of the charge in hopper 29 is continuously measured by means of the scales 31 which generates an output signal that is proportional to the weight of the charge. This signal is coupled to amplifier 33 which amplifies and couples the signal to both the adder and the tare detector. The compensated output of the adder 34 is coupled to the other input of comparator 43. The comparator is strobed at approximately 16.67 ms intervals so that the output thereof is either a logical "1" or "0," depending on whether the weight of the charge is less than or greater than the output of sample and hold circuit, respectively. The output of the comparator is coupled to the SCR flip-flop 42. The SCR circuit 45 is enabled if a logical "1" is coupled thereto and remains off if a logical "0" is coupled thereto.

Figure 7:
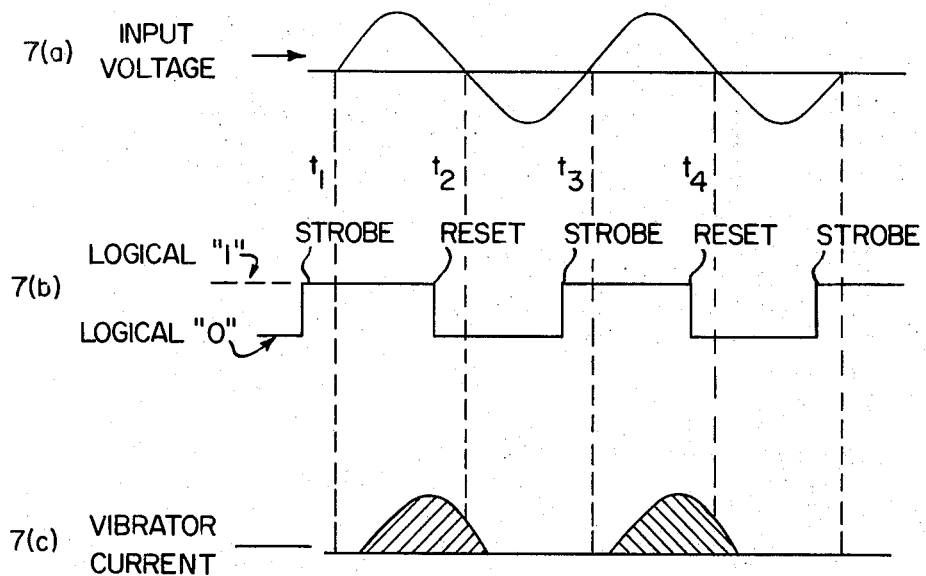
FIG. 7 is a graphical display of the signal voltages associated with the dispenser control circuit.

Refer now to FIG. 7 which illustrates the waveforms associated with the drive circuit for energizing vibrators 23 and 27. FIG. 7(a) is a graphical display of the input voltage waveform at the terminals 51 of the vibrator drive circuit. The signal as illustrated is an ordinary sinusoidal signal which may be derived from a wall outlet. FIG. 7(b) is a graphical display of the output of the SCR flip-flop, which output is coupled to the gate of the zero crossing SCR circuit 45, and FIG. 7(c) is a graphical display of the input voltage applied to the vibrators 23 and 27. As illustrated the output of the SCR flip-flop is either in a logical "1" or logical "0" state. When in the logical "1" state, the SCR circuit 45 is enabled such that the input voltage illustrated in FIG. 7(a) is coupled therethrough to the vibrators 23 and 27. When, however, a logical "0" is coupled to the gate, the SCR circuit does not turn off since current through the SCR circuit must go to approximately zero before the SCR in the circuit will cease conduction. Accordingly, as the SCR circuit continues to conduct when the logical "0" signal is coupled to the gate terminal thereof until the current goes to approximately zero.

The logical "1" state at the gate of the SCR 45 circuit exists each time the voltage $E_s$ is less than $E_c$. Accordingly, when this condition occurs a half wave rectified AC current will flow through the vibrators 23 and 27 thus energizing these feeders. A resistor $R_1$ may be provided for adjusting the power input to the vibrators thereby controlling the amplitude of the vibrational movement of feeders 23 and 27.

From the aforementioned description of the operation of the weight control system, it can now be seen that a decision to feed added material to the charge in hopper 29 is made repeatedly during the dispensing cycle and that the decision is made by comparing a moving analog of the theoretical optimum weight of the charge with the actual weight of the charge as material is dispensed into hopper 29. Since the analog of the optimum weight increases at a decreasing rate, only small quantities of material will be in transit between the feeder pans and the charge hopper as the weight of the charge approaches the desired weight level. Accordingly, the variance in weight of the charge from a desired weight level due to random fluctuations in the quantity of charge being dispensed is minimized.

As extraneous material adheres to the charge hopper 29, the weight of the hopper and hence the output of the scales 31 gradually increases. Because of the extra weight of the charge hopper, less packageable material is poured into the hopper due to the erroneous output of the scale. Accordingly, to compensate for the gradually increasing weight of the hopper 29, the tare detector periodically measures such weight and through the adder subtracts the value of the accumulations from the scale signal. Thus the adder output represents the net value of scale hopper contents 28 exclusive of accumulations. It should be understood that any inaccuracies in the output of the scale due to changes within the scale itself will be compensated by the aforementioned compensation circuitry.

Figure 9:
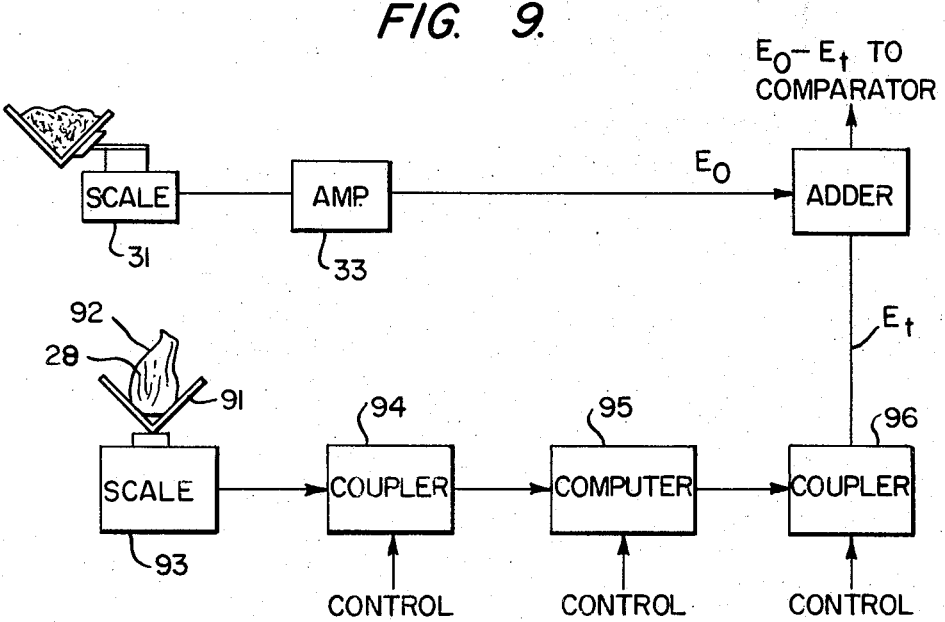
FIG. 9 is an alternate embodiment of the tare weight measuring circuit of the invention.

An alternate method and apparatus for detecting foreign accumulations on the charge hopper 29 is illustrated in FIG. 9. After a charge has been formed in hopper 29, it is placed in a container or bag 92 for final distribution. The container is placed in hopper 91 of another scale 93. Scale 93 generates a signal proportional to the weight of the charge in hopper 91 which signal is coupled to a coupler 94. Coupler 94 conditions and/or amplifies the scale output signal and converts it to a desired digital equivalent. The digitalized output of the coupler 94 is coupled to a computer 95 for storage. This process is repeated so that a plurality of values are stored in the computer. The computer thus calculates according to a predetermined program based on statistical theory the change in weight of the hopper 29 due to accumulation. If the change in weight is of significance an appropriate correction value is generated by the computer and coupled to the adder circuit 34 via a second coupler circuit 96. Thus the scale signal $E_o$ is corrected for extraneous foreign material or accumulations which cause a gradually changing biasing weight on the scale 31.

Figure 6:
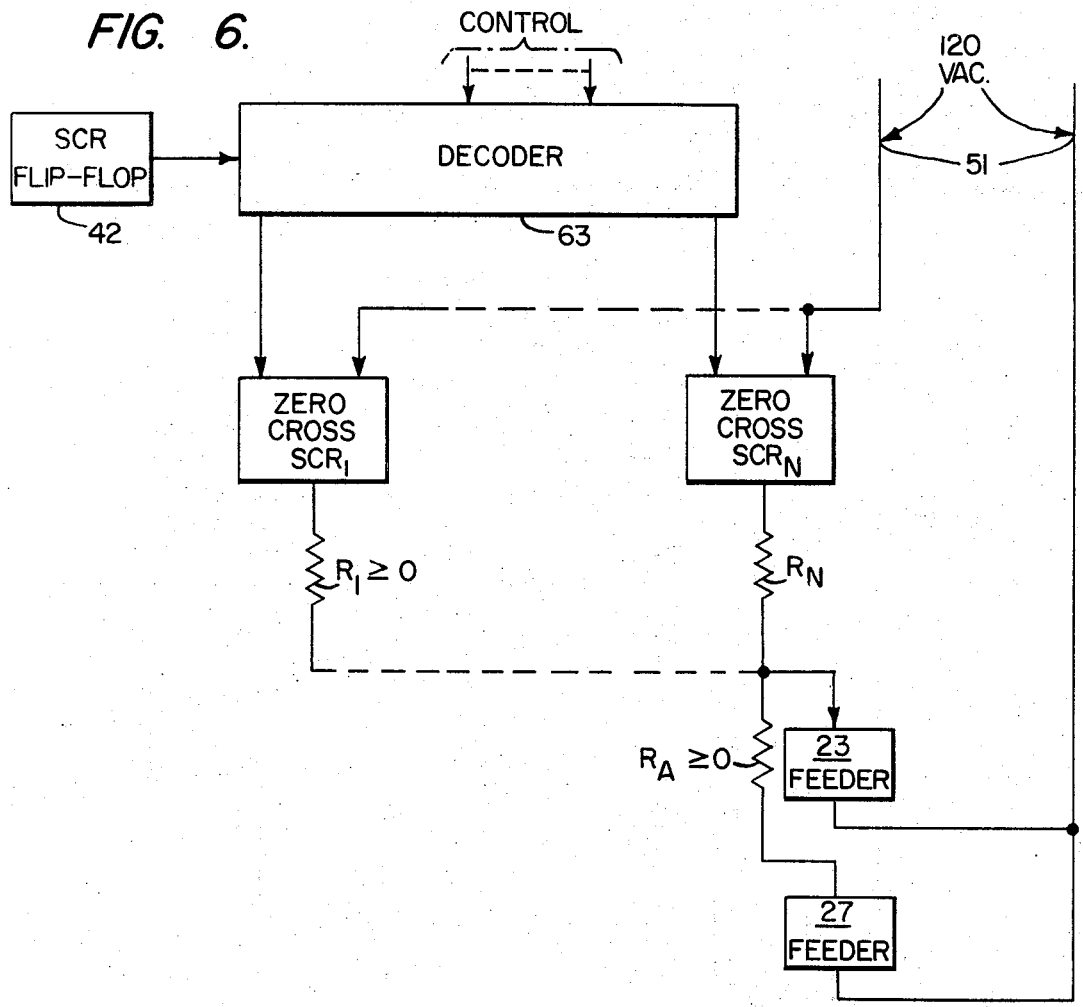
FIG. 6 is a block diagram of an alternative embodiment of the invention having a plurality of gates for conducting weighted levels of current to the dispenser.

Refer now to FIG. 6 which illustrates an alternate embodiment of the invention. A plurality of zero-crossing SCR circuits are shown connected in parallel between the vibrators 23 and 27 and the input terminals 51 of the vibrator drive circuit. A resistor is connected in series with each SCR with each resistor from $R_1$ to $R_n$ having a progressively increasing resistance. The output of the SCR flip-flop 42 is selectively connected to the SCR circuits through a decoding circuit 63. The circuit 63 which may be any one of a number of commercially available decoders is programmed or controlled by the output of timing control circuits 41.

In practice it is sometimes desirable to vibrate the feeders with high amplitude vibrations at the beginning of a dispensing cycle and then gradually reduce the vibrational level of the feeders as the accumulated weight of the charge approaches the desired weight limit. Thus, circuit $SCR_1$ having a relatively small resistance $R_1$ connected in series therewith is initially connected to comparator 43 for a given period of time. Then circuit $SCR_2$ with a larger resistance $R_2$ in series therewith is electrically connected to the comparator and so on until finally circuit $SCR_n$ with the largest resistance $R_n$ in series therewith is connected to the comparator. This arrangement causes a large excitation current to be initially fed to vibrators 23 and 27. Then as the weight of the charge increases, the amplitude of the current fed to the vibrator gradually decreases since SCR circuits having progressively larger resistances in series therewith are sequentially gated by the control circuits. As a result the variance in the ultimate charge weight is reduced since the quantity of material in transit between the feeders and the charge hopper 29 is reduced as the accumulated weight of the charge approaches the desired level.

While the preferred embodiment has been described in connection with forming a charge in charge hopper 29 and then dumping the charge into a package for shipment, it should be understood that the method and apparatus of this invention can be readily utilized to directly fill a package. In this case, the package could be placed on the scales 31 and the material dispensed thereinto from the feeder pans. In addition, while the preferred embodiment has been described in connection with an analog optimum weight profile curve, the optimum weight profile curve can be digitalized, stored and then reconverted back to an analog signal for comparison with the output voltage from the scale, or in the alternative, the digital values of the profile curve can be computed sequentially and instantaneously as the charge is being formed. This can easily be accomplished by known techniques with the aid of a small digital computer. Further, the output of the scale representing the weight of the material in the charge being formed can be digitalized and processed by digital circuitry so that the aforementioned digital values of the optimum weight profile curve can be directly compared therewith. As another alternative, the output of the scales can be digitalized, stored and/or transmitted to a coupler where the signal is converted to an analog signal and then compared with the analog profile curve. It, therefore, can be seen that the profile curve signal and the output of the scale can be made either analog or digital and that various combinations of the two signals can be compared provided both signals are converted to a digital or analog form.

It should be further understood that while the invention has been described in connection with a preferred embodiment, it is not intended to limit the invention to the particular form set forth. On the contrary, it is intended to cover such alternatives, modifications and equivalents as may be included within the spirit and scope of the invention as defined by the appended claims.

What is claimed is:

1. A weight control system comprising
    means for continuously weighing a charge of material as said charge is being formed and generating an output proportional to the instantaneous measured weight of said charge,
    means for generating a weight profile curve, said curve representing the optimum desired weight of said charge with respect to time as said charge is being formed,
    means for comparing periodically during the time of formation of said charge points of optimum weight on said weight profile curve with said generated output proportional to the instantaneous weight of said charge and producing a signal indicative of the difference thereof,
    means for dispensing material to form said charge, and
    means activated by said signal for energizing said material dispensing means each time said measured weight of said charge is less than the optimum weight represented by said weight profile curve to thereby increase the weight of said charge.

2. The weight control system of claim 1 wherein said means for generating said weight profile curve comprises means for generating a progressively increasing signal having an asymptote which corresponds to the desired end weight of said charge, and means for storing the value of said signal at predetermined time intervals.

3. The weight control system of claim 1 further comprising means for compensating said measured weight of said charge for error in the net charge weight measured by said weighing means.

4. The weight control system of claim 3 wherein said compensating means includes means for periodically measuring and storing a signal representing the error in the output of said weighing means due to a non-zero charge weight measurement and adder means for subtracting said signal representing the error in the output of said weighing means from said measured weight of said material, the resulting signal representing the net weight of the material in said charge.

5. The weight control system of claim 2 further comprising means for progressively decreasing the level of energization of said dispensing means as said charge is formed.

6. The weight control system of claim 2 wherein said material dispensing means comprises at least one feeder, said feeder dispensing material therefrom when vibrated and wherein said material dispenser energizing means comprises an SCR between a vibrator and a source of current, said SCR being enabled when the weight of said charge is less than the weight represented by said optimum weight profile curve.

7. A package weight control system comprising means for weighing a package as said package is being filled and generating an output proportional to the instantaneous measured weight to said package, means for generating a package weight profile curve, said curve representing the optimum desired weight of said package with respect to time as said package is being filled, means for comparing periodically during the time of filling of said package points of optimum weight on said package weight curve with said generated output proportional to the instantaneous weight of said package and producing a signal indicative of the difference thereof, a material dispenser for filling said package, and means activated by said signal for energizing said material dispenser when said measured weight of said package is less than the optimum weight represented by said package weight profile curve to thereby increase the weight of said package.

8. A weight control system comprising means for continuously weighing a charge of material as said charge is being formed, means for generating a weight profile curve comprising means for generating a progressively increasing signal having an asymptote which corresponds to the desired end weight of said charge, means for progressively decreasing the level of energization of said dispensing means as said charge is formed, and means for storing the value of said signal at predetermined time intervals, said curve representing the optimum weight of said charge with respect to time as said charge is being formed, means for comparing said weight profile curve with said measured weight of said charge, means for dispensing material to form said charge comprising at least one feeder, said feeder dispensing material therefrom when vibrated and wherein said material dispenser energizing means comprises an SCR between a vibrator and a source of current, said SCR being enabled when the weight of said charge is less than the weight represented by said optimum weight profile curve, means for energizing said material dispensing means each time said measured weight is less than the weight represented by said weight profile curve, and means for compensating said measured weight of said charge for error in the net charge weight measured by said weighing means, said compensating means comprising a second means for weighing the charge of material after said charge has been formed, means for storing the values of the measured weight of a plurality of formed charges, means for calculating the difference between the average final charge weight and a desired charge weight, means for generating a compensating signal when said difference is greater than a predetermined amount, and means for substracting said compensating signal from said signal representing the weight of the charge being formed.

* * * * *